(12) United States Patent
Pientka et al.

(10) Patent No.: US 6,545,285 B1
(45) Date of Patent: Apr. 8, 2003

(54) SENSOR DEVICE FOR DETECTING MOISTURE ON A WINDOW

(75) Inventors: Rainer Pientka, Renchen (DE); Manfred Burkart, Iffezheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,492

(22) PCT Filed: Jan. 22, 1999

(86) PCT No.: PCT/DE99/00149

§ 371 (c)(1),
(2), (4) Date: Mar. 6, 2000

(87) PCT Pub. No.: WO99/52749

PCT Pub. Date: Oct. 21, 1999

(30) Foreign Application Priority Data

Apr. 8, 1998 (DE) .......................... 198 15 748

(51) Int. Cl.[7] ................................. H01J 5/16
(52) U.S. Cl. ................. 250/574; 250/227.25; 318/483
(58) Field of Search ................. 250/573, 574, 250/575, 227.25, 239, 216; 318/483, DIG. 2; 340/602, 603, 604

(56) References Cited

U.S. PATENT DOCUMENTS

| | | | |
|---|---|---|---|
| 5,015,931 A | | 5/1991 | Muller |
| 5,498,866 A | | 3/1996 | Bendicks et al. |
| 5,661,303 A | | 8/1997 | Teder |
| 5,898,183 A | * | 4/1999 | Teder .................. 250/574 |

FOREIGN PATENT DOCUMENTS

| | | |
|---|---|---|
| DE | 197 01 258 | 7/1997 |
| JP | 09 257952 | 10/1997 |
| JP | 10 138878 | 5/1998 |

* cited by examiner

*Primary Examiner*—Kevin Pyo
(74) *Attorney, Agent, or Firm*—Kenyon & Kenyon

(57) ABSTRACT

A sensor device is described for detecting wetting of a windshield that has only one transmitter with which two measuring zones of the sensor device can be implemented on a wettable outside of the windshield. A light guidance body injecting transmitter radiation into the windshield has structures with which the transmitter radiation emitted by the transmitter is collected and parallelized in two different directions.

15 Claims, 3 Drawing Sheets

SENSOR DEVICE FOR DETECTING MOISTURE ON A WINDOW

FIELD OF THE INVENTION

The present invention relates to a sensor device for detecting wetting of a windshield.

German Patent 197 01 258 describes a sensor device that operates according to an optoelectronic principle for controlling wash/wipe systems for automotive windshields. The sensor device has multiple transmitters and at least one receiver for injecting and outputting via a coupling means a defined radiation into and out of the windshield whose wetting due to moisture or soiling is to be measured. The radiation is completely reflected at least once in the windshield on the (dry) surface of the windshield due to the injection angle and finally is outputted again to a receiver at a predetermined location. Total reflection is prevented by wetting of the surface of the windshield (air, water, ice, soiling, fog, etc.), resulting in wetting-dependent radiation losses due to output of a portion of the radiation from the original beam path, e.g., due to water droplets. The diminished radiation detected by the receiver is outputted as a sensor signal to a signal processing arrangement, where it is analyzed with regard to controlling a wash or wipe system for an automotive windshield, for example. A controller controls the wiper motor in continuous or interval wiping mode as a function of the sensor signal analyzed.

According to German Patent 197 01 258, the transmitters are arranged concentrically around the receiver on the coupling means or concentrically in sections, the coupling means having a circular or toroidal design, Thus, a circular base area is spanned by transmitters, receivers and coupling means. For this reason, the sensor, i.e., the sensor casing, is in the form of a round cylinder.

The sensitive area of the sensor is defined by the sum of the measuring ranges of the windshield between a transmitter and the respective receiver, i.e., the one receiving the radiation. The measuring range is understood to be the range on the wettable side of the windshield within which the transmitter radiation is completely reflected in the absence of wetting, and therefore the transmitter radiation can be outputted more or less in the measuring range because of wetting of the windshield.

One disadvantage here is that the same number of transmitters must be used for a given number of measuring ranges, i.e., sensitive area. However, a large number of transmitters and/or receivers leads to high manufacturing costs.

Another disadvantage is that the large number of transmitters and the circular arrangement of transmitters lead to a relatively great extent of the sensor and its contact area on the windshield and therefore make the sensor noticeable and cause interference for the driver of the vehicle when it is mounted within the wiping area on the windshield, as is customary today.

SUMMARY OF THE INVENTION

The sensor device according to the present invention has the advantage that two measuring ranges of the sensor can be achieved on the wettable outside of the windshield with only one transmitter, because a light guidance body that injects the transmitter radiation into the windshield has at least one structure with which the transmitter radiation emitted by the transmitter is collected and/or parallelized in two different directions.

It is especially advantageous that the light guidance body outputting the transmitter radiation from the windshield still has at least one structure with which the transmitter radiation from two different directions detected by the receiver is focused on the receiver. Thus, a sensor device with four measuring zones, i.e., sensitive areas, can be implemented with an arrangement of two transmitters and two receivers with the respective structures of the light guidance body, where the light guidance body also has a small extent and the sensor device has a small contact area on the windshield.

It is also advantageous that these structures have optical lenses or optical surfaces between the ambient medium and the light guidance body with the transmitter or receiver at the focal point. Thus, additional lenses or optical elements in the beam path are unnecessary, and thus the structural design of the light guidance body is simplified, and the overall size of the sensor device is greatly reduced.

For the purpose of optimization of the device, it is advantageous to set the beam angle of the two parallelized transmitter beams emitted by the transmitter at approx. 100° C. to 120°. Thus, the two optical surfaces of the structures can be arranged without any mutual overlap, so that resolution of the focused beams is high.

It is also especially advantageous to arrange two transmitters and two receivers so that their images in a plane parallel to the windshield form the corner points of a parallelogram, with the beam angle of the transmitter radiation bundled on the receiver from two different directions is approx. 60° to 80°. The structure focusing on the receiver thus has two overlapping optical surfaces, but they do not cause any interference in focusing the beams on the receiver.

In addition, the optical axes of the structures of the light guidance body are preferably aligned at an angle of inclination of approx. 45° to the windshield. Therefore, the transmitter radiation in the light guidance body can be injected into the windshield without further deflection, so that when the windshield is clean and dry, the light is completely reflected on the outside of the windshield and is relayed further in the windshield.

When the transmitter is arranged on a circuit board parallel to the windshield, the angle of inclination of approx. 45° also permits an optimal light yield of the transmitter, because when using a light emitting diode or a chip with a luminous surface parallel to the windshield as the transmitter, the radiation it emits in a solid angle is subject to Lambert's cosine law.

Due to the advantageous arrangement of the two transmitters and two receivers in the form of a parallelogram, the contact area of the sensor on the windshield is preferably rectangular or also a parallelogram. An oval contact area of the sensor with an oval light guidance body is also possible.

DETAILED DESCRIPTION

Figure 1:
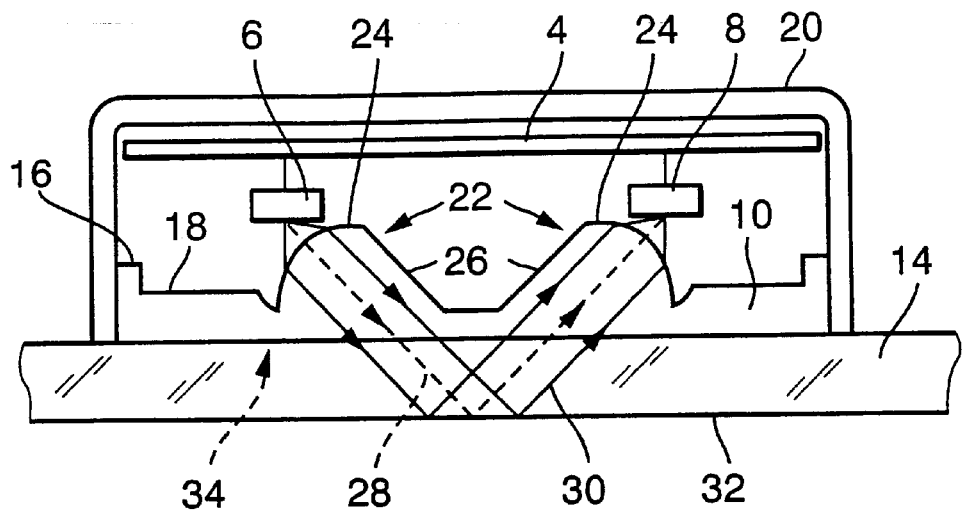
FIG. 1 shows a through section of a transmitter and a receiver of a sensor device according to the present invention.

FIG. 1 shows a sectional diagram of an optoelectronic sensor device mounted on an automotive windshield 14 to detect wetting with moisture or soiling of windshield 14. The sensor device has a casing 20 which is mounted on windshield 14, in particular by gluing or pressing. A light guidance body 10 having two structures 22 projecting on a top side 18 of light guidance body 10 facing the interior of the sensor is also in direct contact with windshield 14 light guidance body 10 is pressed against windshield 14 by casing 20 with a clamping spring, for example, or is glued to it. Structures 22 have lens-like optical surfaces 24. A transmitter 6 and a receiver 8 are located at the focal point of optical surfaces 24. Both are mounted on and parallel to a circuit board 4 which is in turn arranged parallel to windshield 14 inside sensor device casing 20.

The beam path of transmitter radiation 30 is depicted along optical axes 28 of optical surfaces 24. Transmitter radiation 30 is aligned in parallel to optical surface 24 of structure 22 assigned to transmitter 6 and is sent in a light guide 26 to the base of fiber optic light guidance body 10. Beam path 30, aligned in parallel, is first inputted into windshield 14 by light guidance body 10 and is subject to at least total reflection on outside 32 of clean and unwetted windshield 14, and it is outputted from windshield 14 by light guidance body 10 and refractive surface 24 of additional structure 22 provided for receiver 8 and then it is focused on receiver 8.

Figure 2:
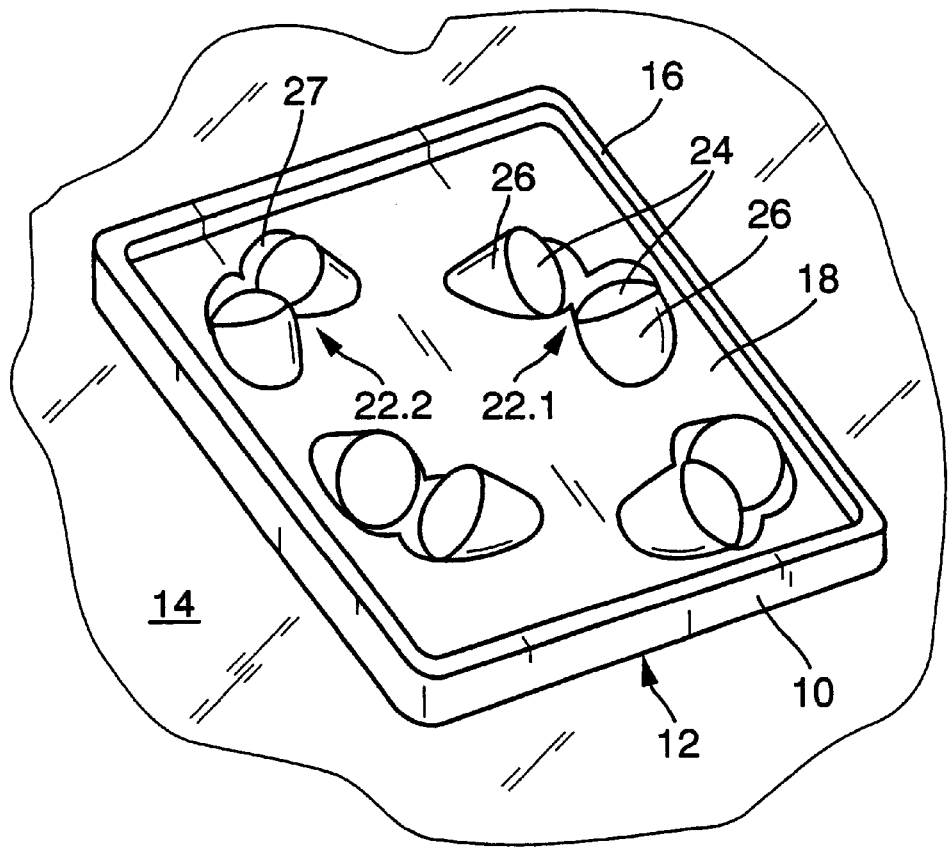
FIG. 2 shows a light guidance body of a sensor device according to the present invention.

FIG. 2 shows a perspective view of light guidance body 10 having a rectangular contact area 12 aligned with windshield 14 and top side 18 having a peripheral web 16. Structures 22.1 and 22.2 integrally molded on light guidance body 10 are arranged in pairs and project out of top side 18 of light guidance body 10. A total of four structures 22 each have two lense-shaped curved optical surfaces 24 and each have two cylindrical light guides 26, with optical surfaces 24 extending into the troughs 27 of light guidance body 10 in front of them.

Both light guidance body 10 and structures 22 are made of the same material which is essentially transparent for the transmitter radiation. For example, plexiglass materials, which are pigmented or left transparent according to transmitter radiation 30 used (infrared or visible light), are suitable for this purpose. Pigmenting fiber optic light guidance body 10, e.g., in black, makes it possible to filter out some of the interfering light, i.e., ambient light 34, striking light guidance body 10 through windshield 14 in an unwanted manner.

Figure 3:
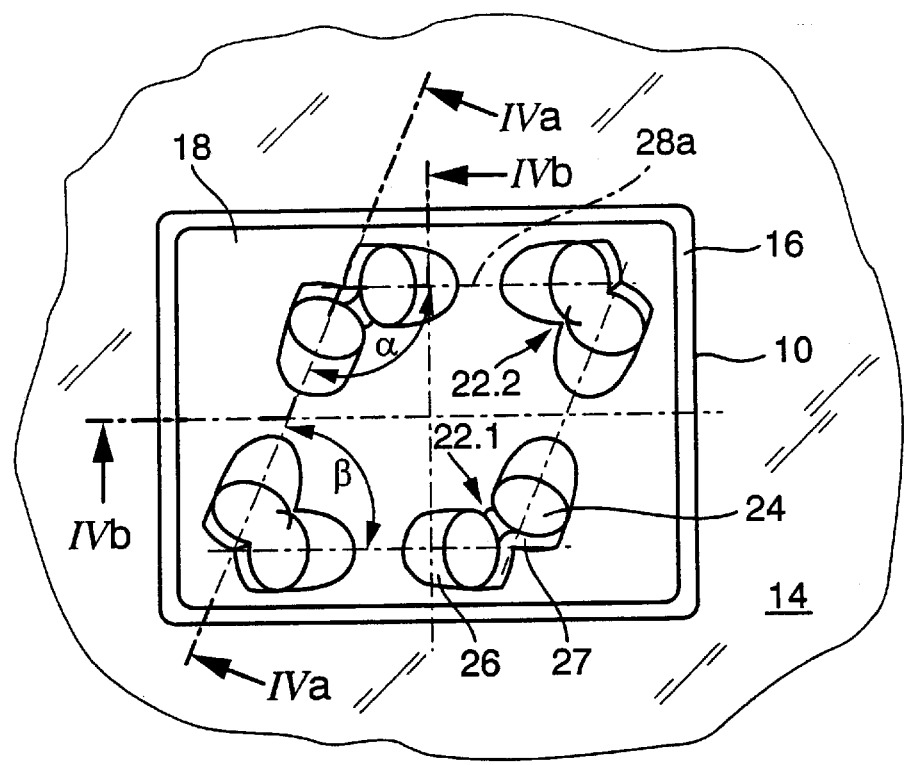
FIG. 3 shows a view of the device shown in FIG. 2.

Fiber optic Light guidance body 10, shown in a perspective view in FIG. 2, is illustrated with a view of top side 18 in FIG. 3. Structures 22 are connected by dash-dot lines 28a which correspond to the, projection of optical axes 28 of optical surfaces 24 on top side 18 parallel to windshield 14. Dash-dot lines 28a form a parallelogram. A transmitter 6 or a receiver 8 is arranged at each corner point of the parallelogram. Inside angles and of the parallelogram correspond to beam angle of the two bundled beams emitted by one of two transmitters 6 along optical axes 28, i.e., lines 28a, and beam angle corresponds to transmitter radiation 30 bundled on one of the two receivers 8 from the two different directions. Beam angle of transmitter 6 is approximately 110°, and beam angle of receiver 8 is approximately 70°

It can also be seen on the basis of FIG. 3 that structures 22.1 and 22.2 are different. Structures 22.1 assigned to beam angle of transmitters 6 are characterized by complete circular optical surfaces 24 and light guides 26. Structures 22.2 assigned to beam angle of receivers 8 have optical surfaces 24 and light guides 26 that are interlinked and merge into one another.

Figure 4A:
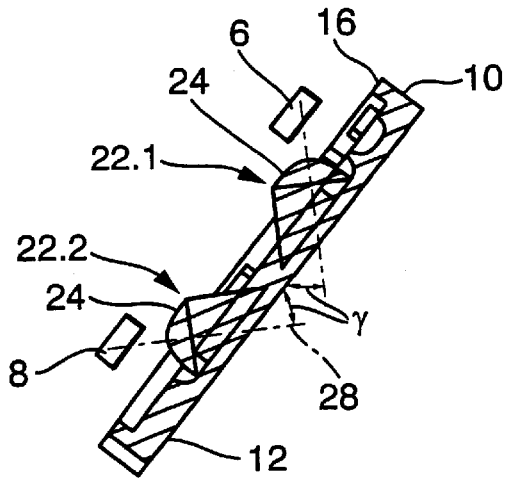
FIG. 4a shows a section along line Iva-IVa through a transmitter and a receiver of the light guidance body shown in FIG. 2.

FIG. 4a shows a section through light guidance body 10 and two structures 22.1 and 22.2 along line IVa—IVa according to FIG. 3. Optical axes 28 of optical surfaces 24 and a transmitter 6 and a receiver 8 are shown here. Angle of inclination of optical axes 28 relative to contact area 12, i.e., to outside 32 of the windshield, is approximately 45° and thus permits total reflection of incident transmitter radiation 30 on outside 32 of the windshield.

Figure 4B:
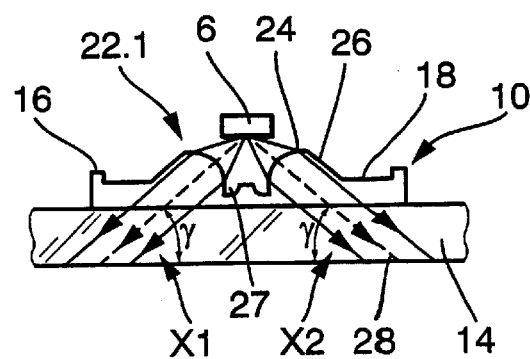
FIG. 4b shows a section along line Ivb-IVb through a transmitter of the fiber optic light guidance body shown in FIG. 3.

FIG. 4b shows a section along line IVb—IVb, according to FIG. 3, through light guidance body 10 and a structure 22.1 assigned to a transmitter 6. Optical axes 28 of optical surfaces 24 of structure 22.1 and transmitter 6 are shown here. This illustrates the parallelization of the transmitter radiation in two directions X1, X2 in a section perpendicular to windshield 14.

Figure 5:
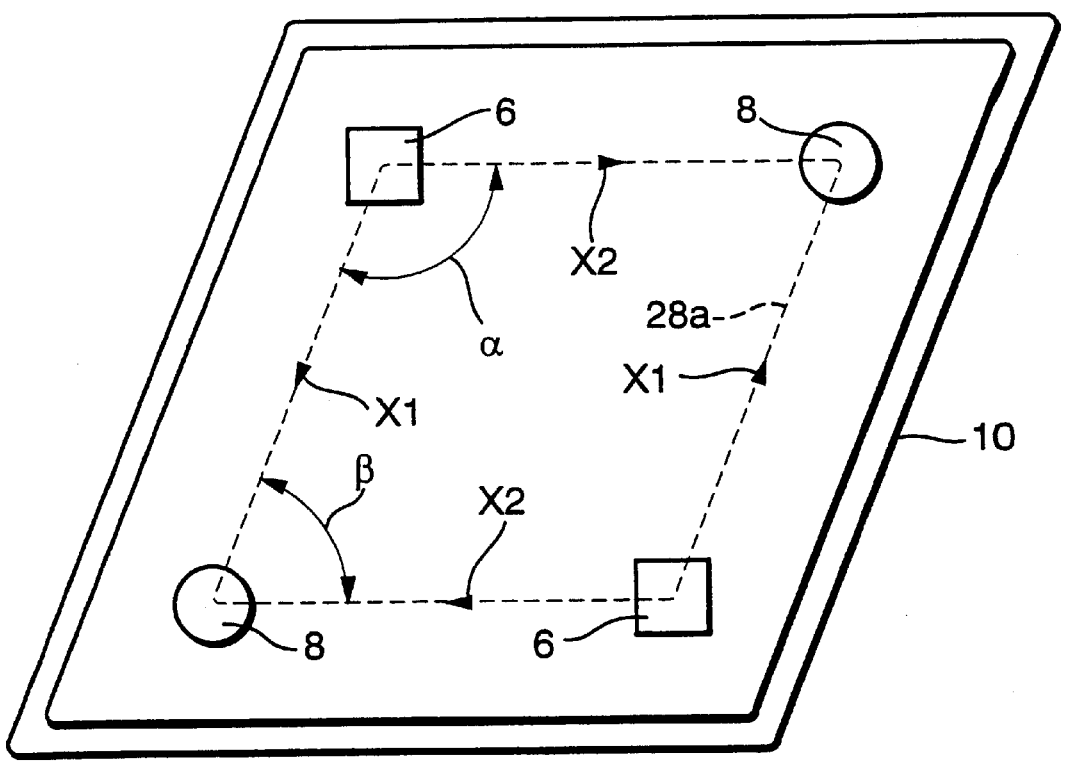
FIG. 5 shows another embodiment of a light guidance body according to the present invention.

FIG. 5 illustrates another embodiment, depicting the arrangement of transmitters 6 and receivers 8 in a parallelogram. Structures 22 have not been shown for the sake of simplicity. Light guide 10 is now also shaped like a parallelogram, but otherwise it has the same properties and features as light guidance body 10 in the first embodiment according to FIGS. 1 through 4. A feature common to both embodiments is, for example, the parallelization of the transmitter radiation of one transmitter 6 in two directions X1, X2 as seen in the view parallel to windshield 14 along dotted lines 28a and the focusing of the transmitter radiation from two directions X1, X2 on one receiver 8.

What is claimed is:

1. A sensor device for detecting wetting of an automotive windshield, comprising:
    at least two light-emitting transmitters;
    at least two receivers; and
    a light guidance body injecting radiation from the at least two light-emitting transmitters into the windshield at an angle of inclination and outputting the radiation from the windshield to the at least two receivers, the light guidance body including at least four structures, each of the at least four structures having two different surfaces to collect and parallelize the radiation from a corresponding one of the at least two light-emitting transmitters in two different directions, wherein the at least two transmitters and the at least two receivers are situated so that images thereof define corner points of a non-right parallelogram, the images being formed by projection onto a plane parallel to the windshield.

2. The sensor device according to claim 1, wherein the two directions form a beam angle of approximately 100 to 200 degrees.

3. The sensor device according to claim 1, wherein the radiation from the at least two light-emitting transmitters on each of the at least two receivers forms a beam angle of approximately 60 to 80 degrees.

4. The sensor device according to claim 1, wherein the angle of inclination of an optical axis of each of the at least four structures to the windshield is approximately 45 degrees.

5. The sensor device according to claim 1, wherein the plane is a surface of the light guidance body.

6. The sensor device according to claim 1, wherein a contact area of the light guidance body on the windshield is rectangular.

7. The sensor device according to claim 1, wherein a contact area of the light guidance body on the windshield forms a parallelogram.

8. The sensor device according to claim 1, wherein a contact area of the light guidance body on the windshield forms an oval.

9. The sensor device according to claim 1, wherein each of the at least four structures is provided for a corresponding one of the at least two light-emitting transmitters and the at least two receivers.

10. The sensor device according to claim 9, wherein each of the at least four structures is a lens pair.

11. The sensor device according to claim 1, wherein the light guidance body filters out an ambient radiation due to one of a pigmentation of the light guidance body and a material of the light guidance body.

12. The sensor device according to claim 11, wherein the pigmentation is black.

13. The sensor device according to claim 1, wherein the light guidance body is secured to the automotive windshield in a casing.

14. The sensor device according to claim 1, wherein each of the at least four structures comprises two lens-like optical surfaces pointing toward a corresponding one of the at least two transmitters and the at least two receivers such that the corresponding one of the at least two transmitters and the at least two receivers is disposed at a focal point of said two lens-like optical surfaces.

15. The sensor device according to claim 1, wherein each of the at least four structures comprises two lens-like optical surfaces and two cylindrical light guides, each of the two cylindrical light guides being connected to a corresponding one of the two lens-like optical surfaces.

* * * * *

UNITED STATES PATENT AND TRADEMARK OFFICE
CERTIFICATE OF CORRECTION

PATENT NO.     : 6,545,285 B1
DATED          : April 8, 2003
INVENTOR(S)    : Pientka et al.

It is certified that error appears in the above-identified patent and that said Letters Patent is hereby corrected as shown below:

<u>Column 2,</u>
Line 66, delete "fiber optic"

<u>Column 3,</u>
Line 24, delete "fiber optic"
Line 52, delete "Fiber optic"

Signed and Sealed this

Fourth Day of May, 2004

JON W. DUDAS
*Acting Director of the United States Patent and Trademark Office*